United States Patent
Rands et al.

(10) Patent No.: US 12,296,905 B2
(45) Date of Patent: May 13, 2025

(54) TECHNIQUES FOR CONTROLLING AUTONOMOUS 4WS VEHICLES

(71) Applicant: Trimble Inc., Westminster, CO (US)

(72) Inventors: Joshua Rands, Westminster, CO (US); Justin Creaby, Westminster, CO (US); Brandon Sights, San Marcos, CA (US)

(73) Assignee: Trimble Inc., Westminster, CO (US)

( * ) Notice: Subject to any disclaimer, the term of this patent is extended or adjusted under 35 U.S.C. 154(b) by 257 days.

(21) Appl. No.: 17/975,414

(22) Filed: Oct. 27, 2022

(65) Prior Publication Data
US 2024/0140527 A1 May 2, 2024

(51) Int. Cl.
| | | |
|---|---|---|
| B62D 7/15 | (2006.01) | |
| A01B 69/04 | (2006.01) | |
| A01B 69/08 | (2006.01) | |
| B62D 7/14 | (2006.01) | |
| B62D 15/02 | (2006.01) | |
| G01S 19/39 | (2010.01) | |

(52) U.S. Cl.
CPC ............ *B62D 7/159* (2013.01); *A01B 69/008* (2013.01); *B62D 7/142* (2013.01); *B62D 15/021* (2013.01); *G01S 19/393* (2019.08)

(58) Field of Classification Search
CPC ...... B62D 7/159; B62D 7/142; B62D 15/021; G01S 19/393; A01B 69/008
USPC .......................................................... 701/41
See application file for complete search history.

(56) References Cited

U.S. PATENT DOCUMENTS

| | | | |
|---|---|---|---|
| 10,512,204 B1 | 12/2019 | Gunbatar et al. | |
| 12,030,569 B2 * | 7/2024 | Solomon | B62D 7/159 |
| 2003/0028303 A1 | 2/2003 | Sebastian et al. | |
| 2003/0088350 A1 | 5/2003 | Lin et al. | |
| 2004/0015284 A1 | 1/2004 | Suissa | |
| 2004/0016589 A1 | 1/2004 | Ulschmid | |
| 2005/0064993 A1 * | 3/2005 | Ginther | F16D 48/06 |
| | | | 477/166 |

(Continued)

FOREIGN PATENT DOCUMENTS

CN    111 750 897 A    10/2020

OTHER PUBLICATIONS

Tan, X et al., "Optimal Control Method of Path Tracking for Four-Wheel Steering Vehicles," Actuators 2022, 11, 61, published Feb. 18, 2022, 16 pages. (Year: 2022).*

(Continued)

Primary Examiner — Yazan A Soofi
Assistant Examiner — Ahmed Alkirsh
(74) Attorney, Agent, or Firm — Kilpatrick Townsend & Stockton LLP (57) ABSTRACT

Disclosed are a method and apparatus for determining the heading of a 4WS vehicle. The 4WS vehicle's dynamic pivot point is calculated from the steering angles. A distance between the dynamic pivot point and a Global Navigation Satellite System (GNSS) antenna is determined. A time delay is determined in the form of the distance between the GNSS antenna and the pivot point divided by the current vehicle horizontal velocity. The time delay is multiplied by a vehicle yaw rate to obtain a result which is added to a GNSS antenna heading to give a true heading. A control point for the 4WS vehicle is selected to allow that control point to follow a desired trajectory.

20 Claims, 9 Drawing Sheets

(56) References Cited

U.S. PATENT DOCUMENTS

| | | | | |
|---|---|---|---|---|
| 2012/0116712 | A1* | 5/2012 | Hollenstein | G01C 21/28 702/150 |
| 2013/0131927 | A1 | 5/2013 | Ishihara | |
| 2017/0282970 | A1* | 10/2017 | Yanez | B62D 6/002 |
| 2017/0282971 | A1* | 10/2017 | Yanez | B62D 5/001 |
| 2019/0315395 | A1 | 10/2019 | Schwalbe et al. | |
| 2019/0315396 | A1 | 10/2019 | Yamamoto | |
| 2019/0315399 | A1 | 10/2019 | Yamamoto | |
| 2020/0102004 | A1* | 4/2020 | Yamazaki | B62D 15/021 |
| 2020/0368629 | A1* | 11/2020 | Moss | A63H 17/21 |
| 2021/0403049 | A1 | 12/2021 | Funke et al. | |
| 2021/0403081 | A1* | 12/2021 | Funke | B62D 6/001 |
| 2021/0403082 | A1 | 12/2021 | Funke et al. | |
| 2022/0073133 | A1 | 3/2022 | Sakayori et al. | |
| 2022/0097704 | A1* | 3/2022 | Collins | B60K 1/02 |
| 2024/0043073 | A1* | 2/2024 | Prashant Rao | B62D 49/0678 |

OTHER PUBLICATIONS

Tan_X._et_al._Optimal_Control_Method_of_Path_Tracking_for_Four-Wheel_Steering_Vehicles.pdf (Year: 2022).*

Extended European Search Report for Application No. 23204602.9-1105, mailed Mar. 26, 2024, 5 pages.

Zhang, Z. et al., "Motion Control of a 4WS4WD Path-Following Vehicle: Dynamics-Based Steering and Driving Models," *Shock and Vibration*, vol. 2021, Article ID 8861159, published Jan. 16, 2021, 13 pages.

Tan, X. et al., "Optimal Control Method of Path Tracking for Four-Wheel Steering Vehicles," *Actuators* 2022, 11, 61, published Feb. 18, 2022, 16 pages.

Hiraoka, T. et al., "Automatic path-tracking controller of a four-wheel steering vehicle," *Vehicle System Dynamics*, vol. 47, No. 10, Oct. 2009, pp. 1205-1227.

* cited by examiner

TECHNIQUES FOR CONTROLLING AUTONOMOUS 4WS VEHICLES

BACKGROUND OF THE INVENTION

The present invention relates to autonomous navigation, and in particular such navigation for Four Wheel Steering (4WS) autonomous vehicles.

Operators want 4WS vehicles because of their ability to make sharper turns and translate smoothly via crab steering. Crab steering allows horizontal translation without introducing yaw (the heading of the vehicle stays constant). 4WS vehicles introduce new vehicle dynamics. 4WS vehicles make sharper turns when the front and rear wheels turn in opposite directions. It is desirable to control the path or tracking of a part of the vehicle referred to as the "control point." The control point on a Two Wheel Steering (2WS) vehicle is typically the rear axle, which is the pivot point. Alternately, the control point can be another position, which is a fixed distance from the pivot point. However, for a 4WS vehicle, the "pivot point" of the vehicle changes depending on the front to rear wheel angle ratio. The desired control point might be the rear axle, or a plow or shovel or other implement pulled or pushed by the vehicle, or some other position. A problem with 4WS is that a shifting pivot point makes certain control points unstable.

Some farm vehicles are used over crops (e.g., a sprayer), and the wheels crush a portion of the crops as the farm vehicle travels. It would be desirable to have the rear wheels of a 4WS vehicle follow in the same tracks as the front wheels, to minimize the crop damage.

Unless otherwise indicated herein, the materials described in this section of the Specification are not prior art to the claims in this application and are not admitted to be prior art by inclusion in this section.

BRIEF SUMMARY OF THE INVENTION

In embodiments, a method and apparatus are provided for determining the heading of a 4WS vehicle. The current front and rear wheel steering angles are measured. The 4WS vehicle's dynamic pivot point is calculated from the steering angles. A distance between the dynamic pivot point and a Global Navigation Satellite System (GNSS) antenna is determined. A time delay is determined in the form of the distance between the GNSS antenna and the pivot point divided by the current vehicle horizontal velocity. The time delay is multiplied by a vehicle yaw rate to obtain a result which is added to a GNSS antenna heading to give a true heading.

In embodiments, the heading calculations are determined using a Kalman Filter. Inputs to the Kalman filter are the vehicle yaw rate, a vehicle speed determined from the GNSS, vehicle dimensions and the current front and rear wheel angles.

In embodiments, a control point for the 4WS vehicle is selected to allow that control point to follow a desired trajectory. The control point is provided to an Ackermann controller running an algorithm for a 2WS mode, providing compatibility with existing systems. For reverse, the control point is flipped to an opposite side of the pivot point.

In embodiments, an alternate method for providing a 4WS control point to a 2WS Ackermann controller is provided. A cross track error (XTE) of the vehicle pivot point compared to a current path curvature of the 4WS vehicle is determined. The XTE is added to the pivot point to generate a control point. The control point is provided to the Ackermann controller.

Advantages of embodiments herein include backward compatibility with existing 2WS controller systems by modifying the inputs to allow a 4WS vehicle to be controlled to have the front and rear wheels follow the same track when the front and rear wheels are not at the same angle. Another advantage is enabling a heading estimate with just one antenna, without the cost of adding a second antenna.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Disclosed are techniques for determining the heading of a 4WS vehicle and having the front and rear wheels follow the same track for a designated control point. Embodiments described below provide backward compatibility with existing 2WS controller systems by modifying the inputs to an Ackermann controller, such as the control point, to allow a 4WS vehicle to be controlled to have the front and rear wheels controlled to follow the same track.

Single Track 4WS

Figure 1:
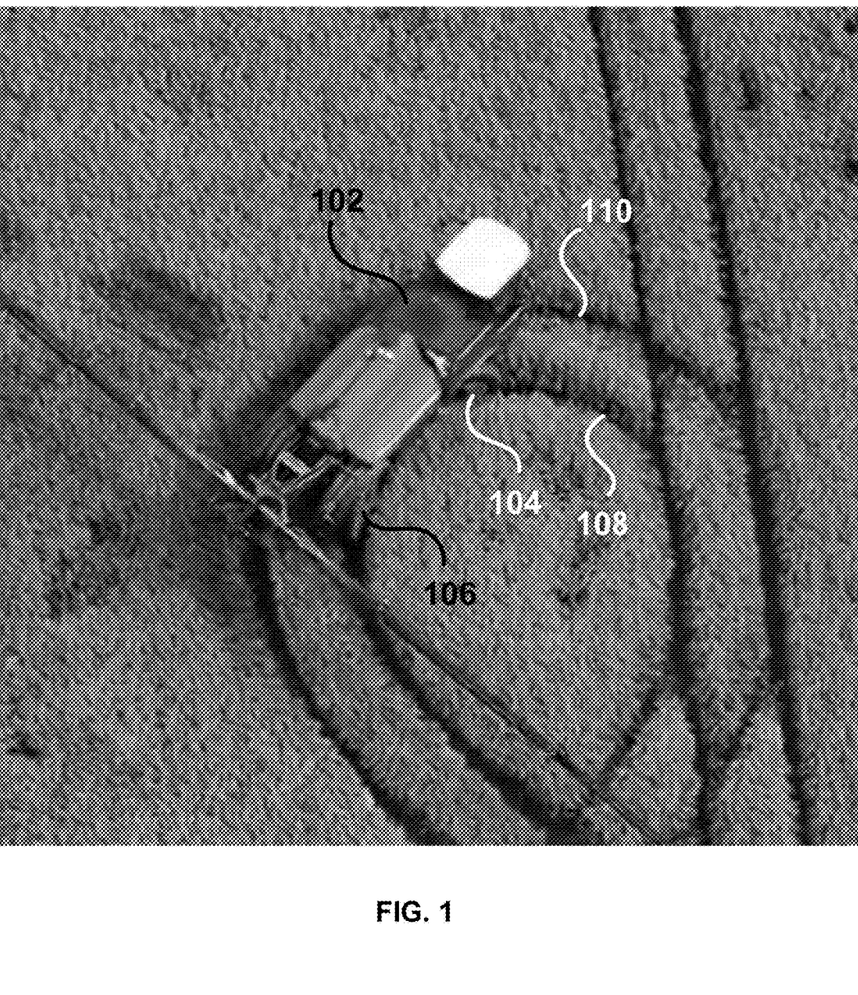
FIG. 1 is a diagram of a 4WS vehicle and its tracks in a field, according to embodiments.

FIG. 1 is a diagram of a 4WS vehicle 102 and its tracks in a field, according to embodiments. Front wheel 104 and rear wheel 106 follow in the same curved track 108 because both wheels are at equal and opposite angles. Front wheel 104 is angled to the right by x degrees, and rear wheel 106 is angled to the left by x degrees. In this manner, only a single track 108 is created by right side wheels 104, 106. A separate track 110 is created by the left side wheels. If the wheels were not at the same and opposite angles, 4WS vehicle 102 could create 4 tracks instead of two, crushing more of the crop it passes over.

4WS State (Heading) Estimation

Figure 2A:
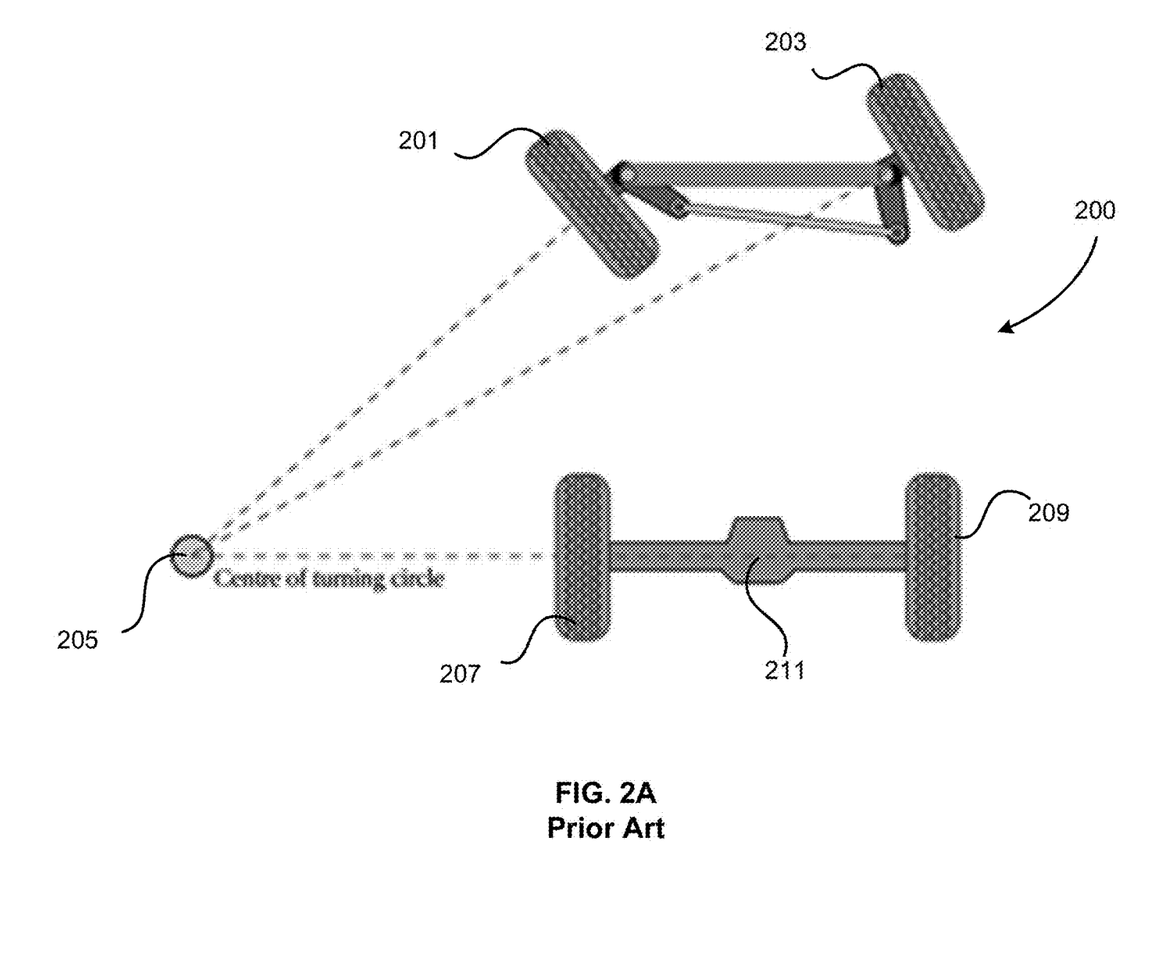
FIG. 2A is a diagram of a prior art 2WS vehicle with angled wheel positions illustrating the position of the pivot point.

FIG. 2A is a diagram of a prior art 2WS vehicle 200 with angled wheel positions illustrating the position of the pivot point. Front wheels 201 and 203 are turned at the same angle, with lines perpendicular to the wheels intersecting, at a point 205, a perpendicular line through the rear wheels 207, 209. The center of the rear axle, 211, is the pivot point.

Figure 2B:
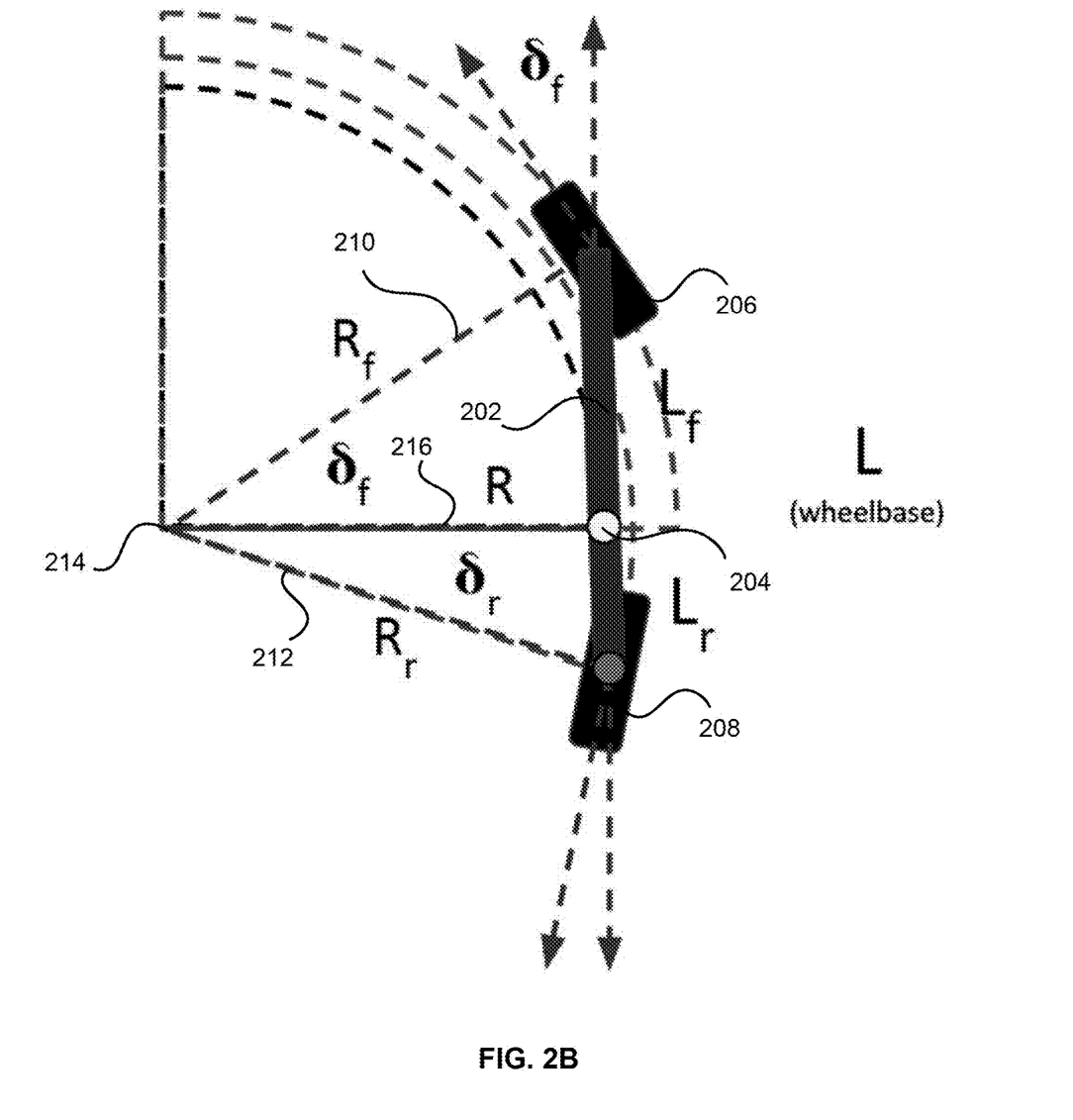
FIG. 2B is a diagram of a 4WS vehicle's wheel positions illustrating the position of the pivot point, according to embodiments.

FIG. 2B is a diagram of a 4WS vehicle's wheel positions illustrating the position of the pivot point, according to embodiments. The pivot point is the point on a vehicle at which the vehicle rotates around in a turn. A standard 2WS vehicle has a pivot point that is in the center of the rear axle as shown in FIG. 2A. A 4WS vehicle has a pivot point somewhere along a center line of the vehicle, between the center of the rear and front axles, where the center line bisects the front and rear axles. Depending on the wheel angles, the pivot point position along the center line changes. FIG. 2B shows just two wheels for simplicity, but those wheels represent 4 wheels. If the front and rear wheels are at the same angle, in opposite directions, the pivot point is exactly in the middle of the center line 202 between the front and rear axles. If the wheel angles are different, the pivot point moves. The pivot point is determined from the angle of the front wheel 206 and rear wheel 208. A line 210 is drawn in line with the front axle, perpendicular to the direction of front wheel 206. A line 212 is drawn in line with the rear axle, perpendicular to the direction of rear wheel 208. The point 214 is where lines 210 and 212 intersect. A line 216 from point 214 to center line 202 is perpendicular to center line 202. The point 204 where line 216 intersects centerline 202 is the pivot point. The distance of pivot point 204 from the rear axle is proportional to the ratio of the steering angle of the rear wheels to the steering angle of the front wheels. Thus, the pivot point can be calculated from this ratio of angles.

Figure 3A:
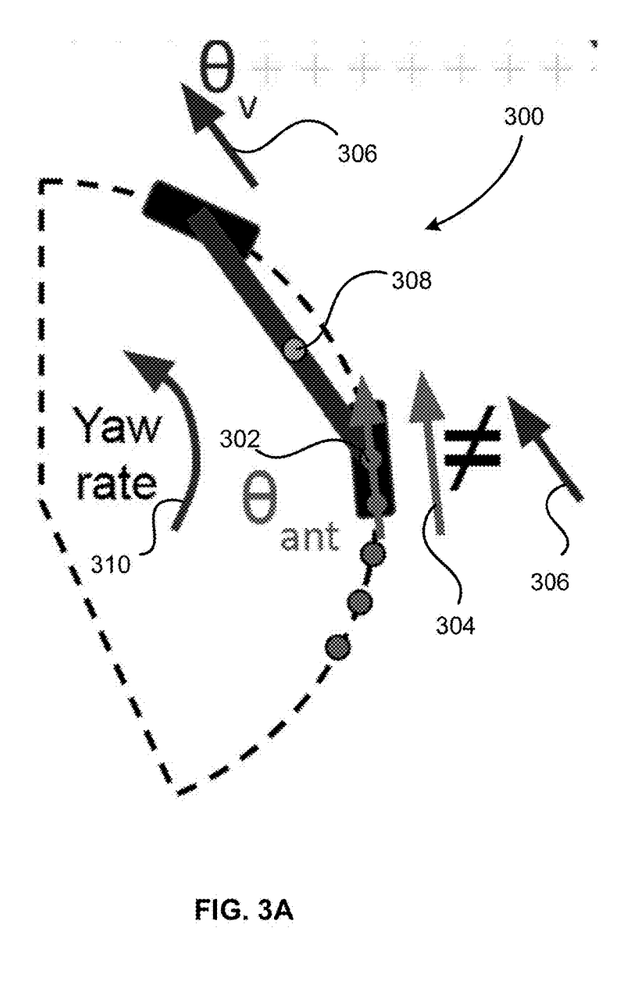
FIG. 3A is a diagram illustrating how 4WS affects the heading of a 4WS vehicle, according to embodiments.

FIG. 3A is a diagram illustrating how 4WS affects the heading of the 4WS vehicle, according to embodiments. For the more common Two Wheel Steering (2WS) vehicles, the rear wheels are fixed, and do not steer. The heading thus corresponds to the angle of the front wheels. However, this correspondence disappears for a 4WS vehicle. FIG. 3A shows a GNSS antenna 302 mounted over a rear wheel of a 4WS vehicle. The direction of the rear wheel indicates a heading 304. However, the true heading is 306. The true heading is the heading at the pivot point 308 of the vehicle. The pivot point moves depending on the steering angles of the front and rear wheels.

Figure 3B:
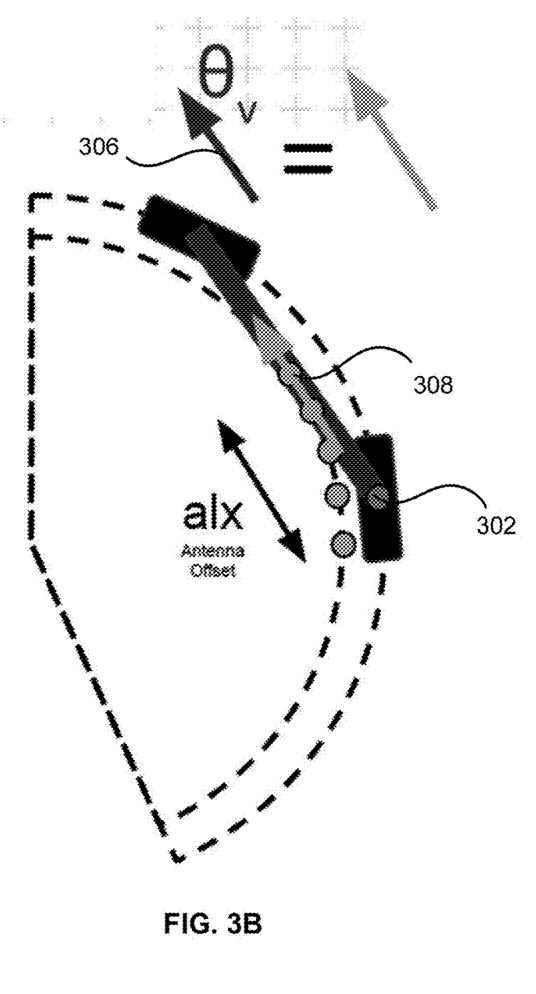
FIG. 3B illustrates the determination of the distance between the pivot point and the GNSS antenna as an antenna offset, according to embodiments.

In embodiments, the true heading 306 of 4WS vehicle 300 is determined as follows. The steering angles of the front and rear wheels are measured. The vehicle's dynamic pivot point 308 is calculated from the current front to rear steering angle ratios as described above with respect to FIG. 2B. The distance between the pivot point 308 and the GNSS antenna 302 is determined as an antenna offset alx as shown in FIG. 3B. A 'time delay' "a" is determined as the time, at the current vehicle horizontal velocity, it will take for the GNSS antenna to reach the position of the pivot point (or vice-versa). In other words, the time delay "a" is alx (the antenna or pivot point offset) divided by the horizontal velocity. The horizontal velocity is derived from the velocity and direction indicated by the GNSS (Global Navigation Satellite System). Alternately, the horizontal velocity can be derived from wheel speed sensors or other sensors on the vehicle. The term "horizontal velocity" as used herein is intended to include the general velocity vector when the vehicle is on slight grade, such that no substantial engineering variance results from using the general velocity vector. The time delay is multiplied by the vehicle yaw rate 310 (the rate of change of the heading angle) with the result being the heading error, Ψerror. The heading error is added to the GNSS antenna heading to give a true heading. The yaw rate is determined from the rotation data provided by an IMU (Inertial Measurement Unit) mounted on the vehicle. In one embodiment, the IMU is mounted at the same location as the GNSS, over the rear axle. The equations for this are below.

$$a = (alx\text{-pivot point offset})/\text{horizontal velocity}$$

$$\Psi\text{error} = a * \text{yaw rate}$$

In embodiments, the above determination of the true heading is calculated using a Kalman filter. Generally, the inputs to the Kalman filter are yaw rate (IMU gyro), vehicle speed (GNSS speed), vehicle dimensions and the measurement of wheel angles. The Kalman filter has an H matrix, typically called the measurement/observation matrix. The H matrix is used to provide information about the various sensor inputs. The output of the Kalman filter is a better estimate of the true vehicle heading.

4WS Offset Control

Figure 4:
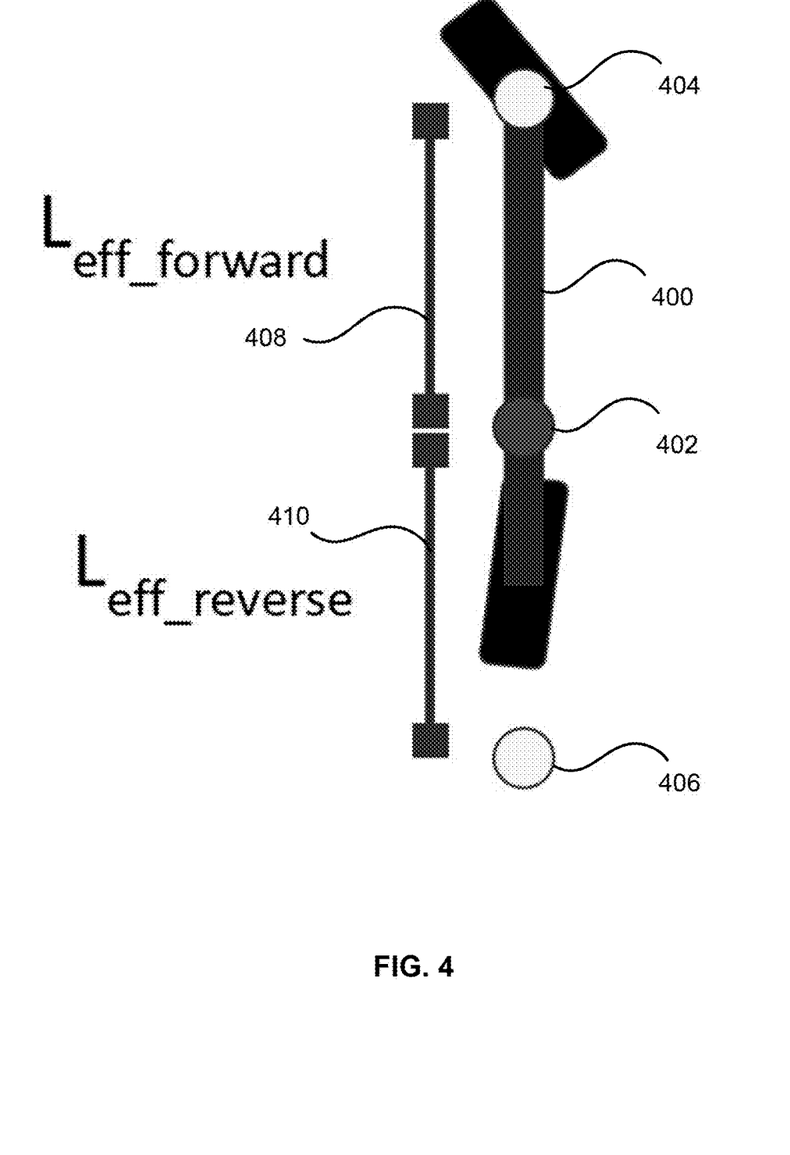
FIG. 4 is a diagram illustrating 4WS offset control, according to embodiments.

FIG. 4 is a diagram illustrating 4WS offset control, according to embodiments. The dynamic shifting pivot point of 4WS makes certain vehicle control points unstable for 4WS vehicles. In particular, a rear axle control point is unstable for 4WS, and the front axle as a control point is unstable when in reverse. Steering will become unstable if the pivot point is in front of the control point when driving forward, or behind the control point driving in reverse. The control point is the point on the vehicle that an operator wants to control to a line. For example, the center of the rear axle is a common control point, or the center of an implement. On a bulldozer, it is desirable to control the edge of the blade, and thus that is the control point. In addition, many vehicles have control systems designed for 2WS, and it would be desirable to switch to 4WS without a completely new control algorithm.

In embodiments, stable control when steering an autonomous 4WS vehicle to a desired trajectory is achieved by scaling controller gains in an existing 2WS control algorithm. The controller controls the vehicle's speed and heading. In one embodiment, the controller is an Akermann controller for front-wheel steering vehicles, using the well-known Akermann's formula for control system design. The controller has 2 major inputs: heading error and cross track error. Both are driven to zero in the controller.

As shown in FIG. 4, vehicle 400 has a pivot point 402. The vehicle pivot point 402 is dynamically calculated as described above with respect to FIG. 2B. A control point is selected, such as the front axle, with control point 404 in the center of the front axle. As can be seen, control point 404 is offset from pivot point 402. The offset distance between the control point and the pivot point is the effective wheelbase, $L_{eff}$. When moving forward, the control point is point 404. When in reverse, control of the front axle as the control point can be accomplished by changing the control point as provided to the Ackermann controller. The control point is flipped over the pivot point to a new control point 406. As can be seen, this control point is beyond the rear of the vehicle, but by using it, the tracking of the front axle can be controlled as desired.

An effective wheelbase 408 is used when moving forward, and an effective wheel base 410 is used when moving in reverse. The control point is always in front of the pivot point in the direction of movement to maintain stability. To achieve control with an existing Akermann controller tuned for 2WS with front wheel steering, the controller gain is scaled by the effective wheelbase (in meters).

In one embodiment, the controller gain for 2WS is scaled by the ratio of the antenna offset to the vehicle baseline according to the following formula:

hdg_comp_gain=gain_val*(cfg→cal.ant_lev_arm[X]/
cfg→type.baseline)

hdg==heading, so hdg_comp_gain is heading compensation gain.

cfg is a data structure containing the control configuration for a particular machine.

cfg→cal.ant_lev_arm[X] is the distance from the rear or fixed axle of the machine to the GNSS antenna position, along the X (forward) direction.

cfg→type.baseline is the wheelbase of the machine (e.g. distance between front and rear axle.

This equation is adjusting the estimated heading by subtracting the heading compensation gain times the measured steering angle (on a 2WS machine):

local_gps_heading_filter·filtered_heading=local_gps_heading_filter·
filtered_heading_raw−
hdg_comp_gain*meas_angle The correct heading is determined using the gain and the measured steering angle according to the following formula:

local_gps_heading_filter·filtered_heading=local_gps_heading_filter·
filtered_heading_raw−
hdg_comp_gain*meas_angle The Kalman filter measurement matrix H is an M×N matrix with M measurements and N states. In this matrix, the 1st column is yaw, the $2^{nd}$ column is yaw rate, and the 3rd column is the heading bias or heading rate bias. The second element in the first row of the measurement matrix H* stores the antenna offset compensation value.

Measurement Matrix:

$$H = \begin{vmatrix} 1 & a & 0 \\ 0 & 1 & 1 \end{vmatrix}$$

The heading rate gyro output is the sum of the true heading rate and the heading rate bias terms (states 2 & 3). "a" is the antenna offset/velocity if the antenna_offset_comp_in_filter is enabled.

Step 4 of the Kalman filter execution updates the predicted state ($X_{k-}$) using measured heading ($Z_k[0]$) and yaw rate ($Z_k[1]$):

$X_k+=X_k-+K_k(Z_k-HX_{k-})$

The bolded term is called the innovation, this is basically the error in the estimate (Z is measured and $X_{k-}$ is predicted). The heading term of the predicted state in the innovation ends up being modified by the previous yaw rate*a. a is the time delay between the antenna and the control point: Yaw rate*time delay=heading error of antenna For 4WS, the gain is tuned for the 4WS pivot point:

hdg_comp_gain=gain_val*(cfg→cal.ant_lev_arm[X]−
nav_get_pivot_point_offset( ))/cfg→type.base-
line)

The sign of the gain is flipped if the pivot point is in front of the antenna.

4WS Pivot Point Control with XTE Bias and Constrained Command Curvature

Figure 5:
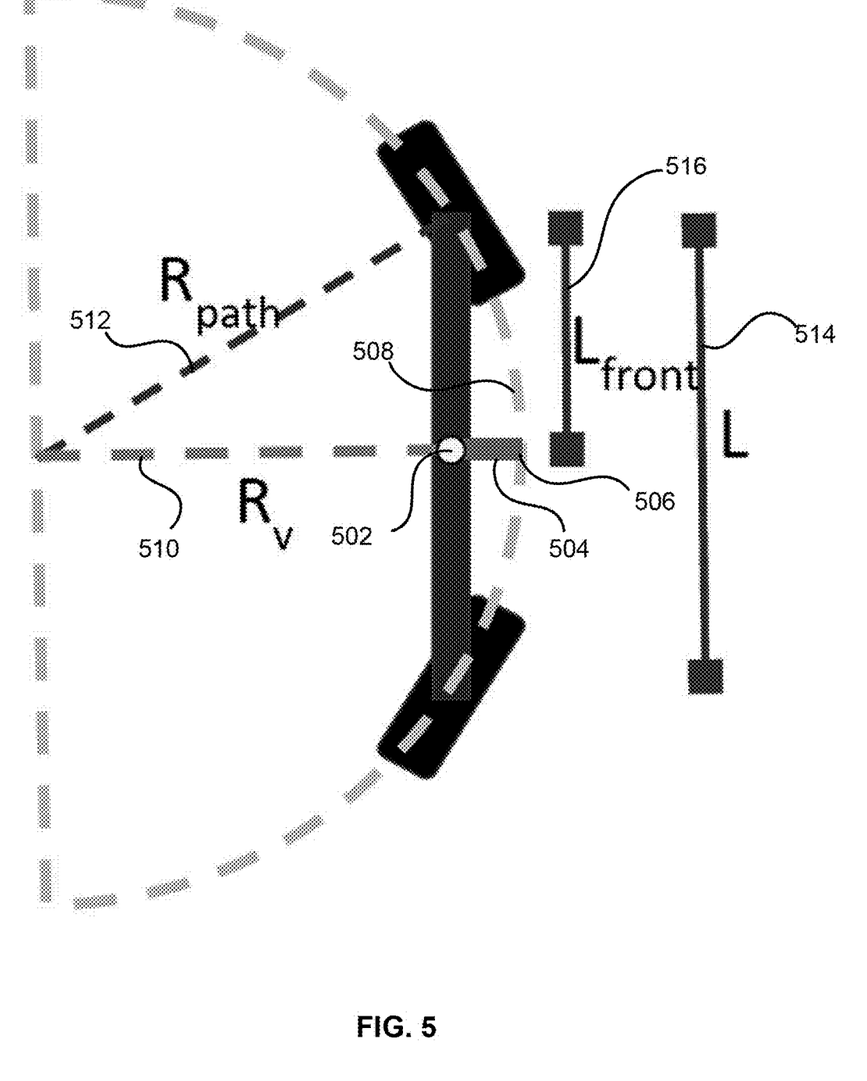
FIG. 5 is a diagram illustrating 4WS pivot point control with a constrained curvature, according to embodiments.

FIG. 5 is a diagram of illustrating 4WS pivot point control with a constrained curvature, according to embodiments. This is an alternative embodiment for determining a control point that will maintain the wheels on a single path. In order to have the rear wheels follow in the tracks of the front wheels, and not further damage crops, both axles are kept on the same trajectory using a single control point. Only a single curvature command is provided to the vehicle controller. Thus, a control algorithm expecting a single curvature for only the front wheels can be used, with the same curvature for both front and rear wheels. Thus, both front and rear wheels are directed to the same steering angle except that there can be a time/distance delay between the wheels reaching the necessary angle to achieve the curvature on the exact same path and the angles may differ if the front and rear axle track widths (distance between the left and right wheels) is different.

Maintaining the single curvature is accomplished by dynamically calculating the vehicle pivot point 502 as described above with respect to FIG. 2B. The control point is set to the pivot point with an XTE (cross track error) 504 to give a control point 506. As can be seen, this control point differs from the embodiment of FIG. 4 since the control point is off to the side of the pivot point, not in front or behind the pivot point. The control point 506 can be made to work to control to the edge of the implement by factoring in the radius of curvature that the implement must follow at that specific point, and offsetting the vehicle control point distance to that implement control point distance. The XTE (cross track error) is the distance a vehicle is to one side of the straight line between two waypoints. In this case, for a constant curvature, XTE is the distance from the pivot point to the wheel path track 508. XTE corresponds to the distance between the radius of curvature $R_V$ (510) of the pivot point to the radius $R_{PATH}$ (512) of the wheel path.

As in the FIG. 4 embodiment, this offset control point is used in an existing Ackermann controller being used for front wheel steer vehicles. A slight modification is made to the offset control algorithm when using 4WS. The offset control algorithm uses an "effective wheelbase" to scale the output command angle:

commandAngle=CLIP_VAL(l_eff*commandAngle,
DEG2RAD*60.0)

commandAngle+=CLIP_VAL($l\_eff$*psi_error, DEG2RAD*60.0)

CLIP_VAL( ) limits the result to +/−the second argument. In this case, the angle is in radians, so the maximum is limited to 60.0 degrees, which is converted to radians by multiplying it by the constant DEG2RAD.

psi_error is the heading error.

L_eff for 2WS is L/control point offset. To enable 4WS control, Leff is set as the ratio of the control point offset to the instantaneous pivot point. When driving in reverse, the control point is mirrored over the instantaneous pivot point. In FIG. 5, the normal wheelbase 514 extends from the front to the rear axles. The effective wheelbase is 516, which is the distance from the instantaneous pivot point 502 to the front axle for the front effective wheelbase.

A heading correction is performed for offset control points as follows:

cp.yaw+=theta*cox/MAX(0.01, nav_config_blk.type.baseline).

cp.yaw is the control point yaw estimate used by the controller.

Theta is the current steering angle.

"cox" is the control offset distance.

nav_config_blk.type.baseline is the wheelbase of the machine (e.g. distance between front and rear axles).

Figure 6:
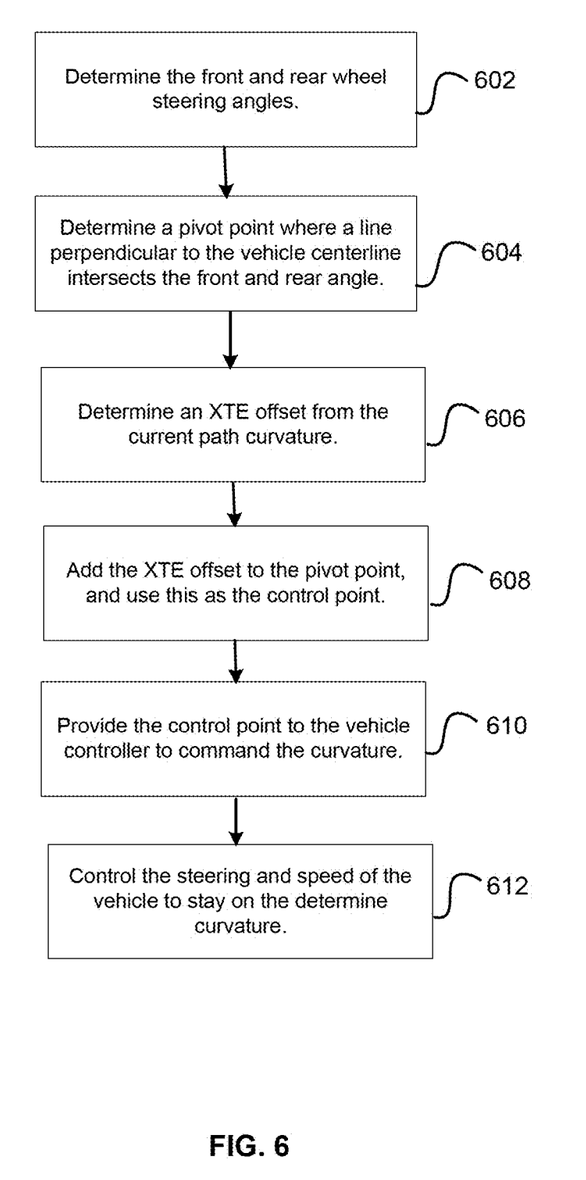
FIG. 6 is a flowchart illustrating vehicle curvature control using an XTE offset according to embodiments.

Thus, the solution of this embodiment works as follows as set forth in the FIG. 6 flow chart. 6. FIG. 6 is a flowchart illustrating vehicle curvature control using an XTE offset according to embodiments. The first step is to determine the front and rear wheel steering angles (step 602). Next, determine a pivot point where a line perpendicular to the vehicle centerline intersects the front and rear angle (604). Determine an XTE offset from the current path curvature (606). Add the XTE offset to the pivot point, and use this as the control point (608). Provide the control point to the vehicle controller to command the curvature (610). Control the steering and speed of the vehicle to stay on the determine curvature (612).

Control System

Figure 7:
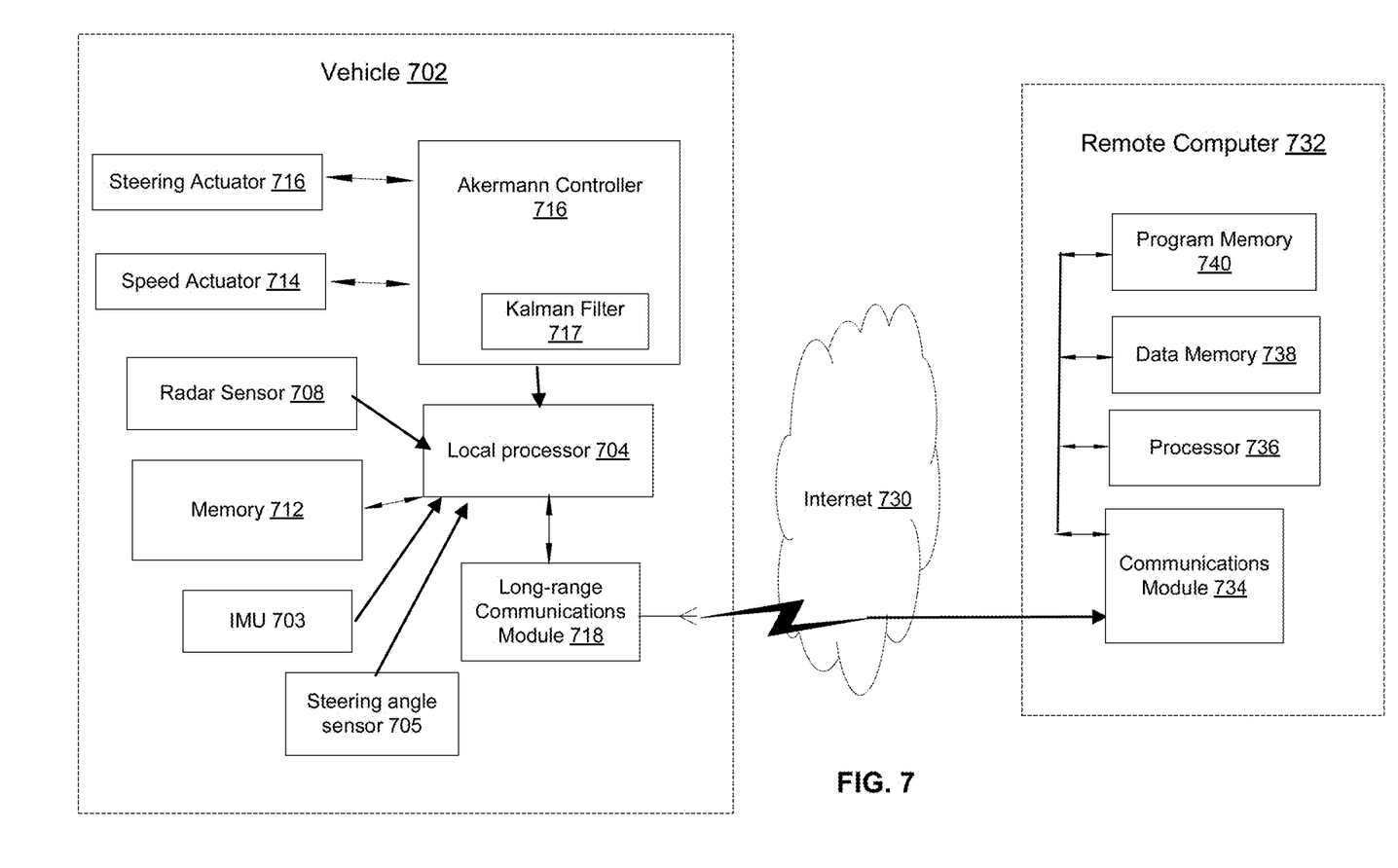
FIG. 7 is block diagram illustrating a control system for a vehicle, according to embodiments.

FIG. 7 is block diagram illustrating a control system for a vehicle, according to embodiments. A vehicle 702 has a processor 704 and one or more sensors, such as a radar sensor 706. Local processor 704 receives the sensor data and calculates the path for the vehicle and the times to slow down or stop to avoid obstacles. A memory 712, which can be multiple memories, stores the data and software programs. Based on the processor calculations, appropriate control signals are sent to a speed actuator 714 and a steering actuator 716.

An Akermann Controller 716 uses a Kalman filter 717, which receives inputs from local processor 704. Those inputs include the yaw rate from IMU 703 and the wheel angles from steering angle sensor 705. Using the calculations described above, Akermann Controller 716 provides corrections to the steering actuator 716.

A long-range communications module 718 provides communications over the internet 730 and/or other networks, to a remote computer 732.

Remote computer 732 has its own communications module 734, processor 736, data memory 738 and program memory 738. Data memory 738 can store the characteristics of each type of vehicle, including dimensions needed to determine the pivot point and control point. Appropriate data can be downloaded to the vehicle 702 memory 712.

The remote computer can be a server, or can be a farmer's computer used to control the farm equipment. A pre-planned path can be generated and wirelessly transmitted using the communications modules to the vehicle 702. The wireless transmission can be over a mobile phone network, via WiFi, etc.

Computer System

Figure 8:
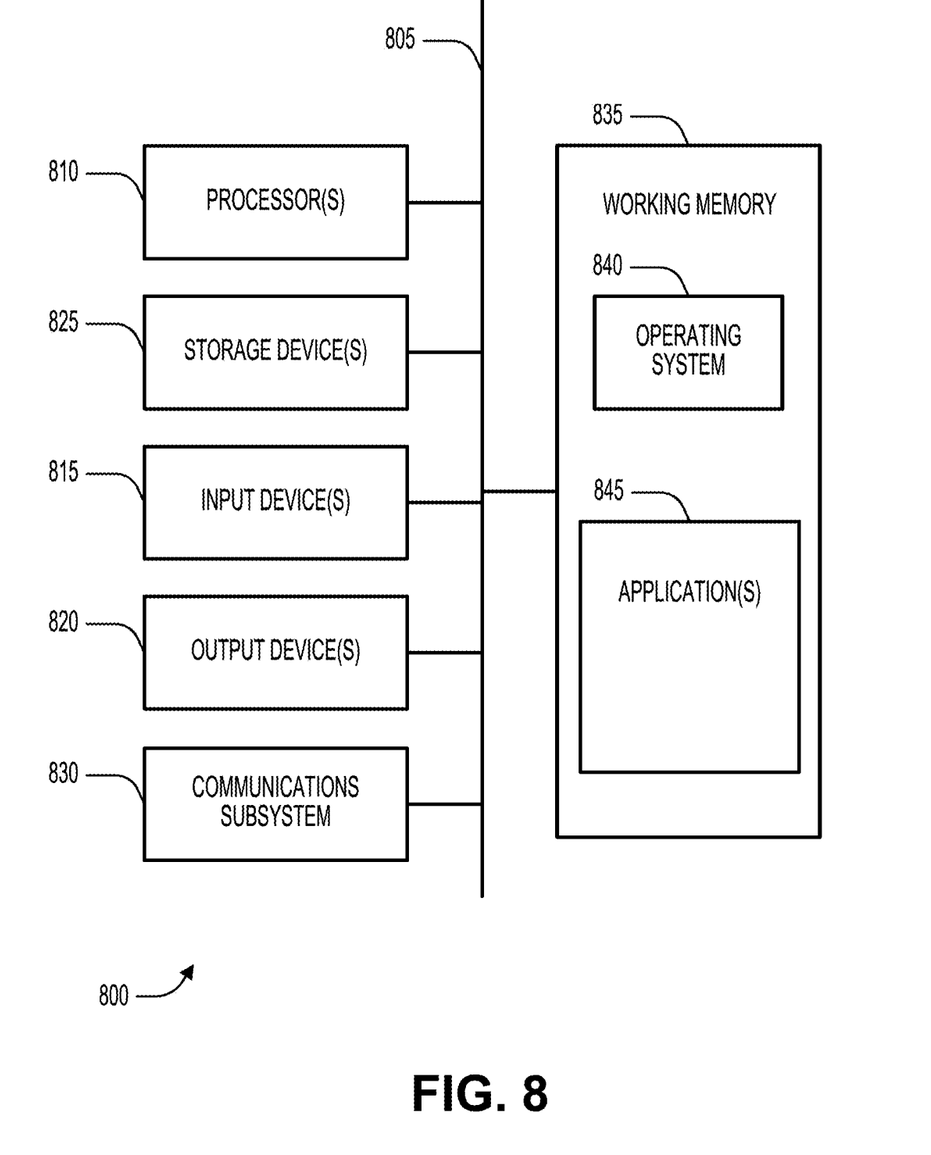
FIG. 8 illustrates a simplified computer system for implementing a 4WS vehicle control system, according to embodiments.

FIG. 8 illustrates a simplified computer system 800, in accordance with some embodiments of the present disclosure. FIG. 8 provides a schematic illustration of one embodiment of computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or more integrated manner.

Computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include, without limitation a mouse, a keyboard, a camera, and/or the like; and one or more output devices 820, which can include, without limitation a display device, a printer, and/or the like.

Computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 800 might also include a communications subsystem 830, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 830 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 830. In other embodiments, a portable electronic device, e.g., the first electronic device, may be incorporated into computer system 800, e.g., an electronic device as an input device 815. In some embodiments, computer system 800 will further comprise a working memory 835, which can include a RAM or ROM device, as described above.

Computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general-purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 800 and/or might take the form of source and/or installable code, which, upon compilation and/or installation on computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 800 to perform methods in accordance with various embodiments of the technology. According to a set of embodiments, some or all of the procedures of such methods are performed by computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for determining the heading of a four wheel steering (4WS) vehicle, comprising:
    measuring a current front wheel steering angle;
    measuring a current rear wheel steering angle;
    calculating the 4WS vehicle's dynamic pivot point from the current front wheel steering angle and current rear wheel steering angle;
    determining a distance between the pivot point and a Global Navigation Satellite System (GNSS) antenna;
    determining a time delay in the form of the distance between the GNSS antenna and the pivot point divided by the current vehicle horizontal velocity;
    determining a vehicle yaw rate for the 4WS vehicle;
    multiplying the time delay by a vehicle yaw rate to obtain a result;
    adding the result to a GNSS antenna heading to give a true heading, the true heading corresponding to the heading at the pivot point of the 4WS vehicle; and
    controlling a steering of the 4WS vehicle based on the true heading.

2. The method of claim 1 wherein at least some of the steps of claim 1 are performed using Kalman filtering.

3. The method of claim 2 wherein inputs to the Kalman filter are the vehicle yaw rate, a vehicle speed determined from one of the GNSS or wheel speed sensors, vehicle dimensions and the current front and rear wheel angles.

4. The method of claim 1 wherein the vehicle yaw rate is determined by an inertial measurement unit.

5. The method of claim 1 wherein the time delay is a horizontal offset of the pivot point from a centerline of the 4WS vehicle divided by a horizontal velocity of the 4WS vehicle.

6. The method of claim 1 wherein the horizontal velocity is derived from a velocity and direction indicated by the GNSS.

7. The method of claim 1 further comprising:
    selecting a control point for the 4WS vehicle, the control point being the point that is controlled to follow a desired trajectory;
    providing the control point to an Ackermann controller; and
    flipping the control point to an opposite side of the pivot point when the 4WS vehicle is in reverse.

8. The method of claim 7 further comprising:
    scaling a gain of the Ackermann controller by the distance between the control point and the pivot point.

9. The method of claim 1 further comprising:
    determining a cross track error (XTE) of the vehicle pivot point compared to a current path curvature of the 4WS vehicle;
    adding the XTE to the pivot point to generate a control point; and
    providing the control point to an Ackermann controller.

10. The method of claim 1 further comprising providing a single curvature command to the 4WS vehicle.

11. A method for determining the heading of a four wheel steering (4WS) vehicle, comprising:
    measuring a current front wheel steering angle;
    measuring a current rear wheel steering angle;
    calculating the 4WS vehicle's dynamic pivot point from the current front wheel steering angle and current rear wheel steering angle;
    determining a distance between the pivot point and a Global Navigation Satellite System (GNSS) antenna;
    determining a time delay in the form of the distance between the GNSS antenna and the pivot point divided by the current vehicle horizontal velocity;
    determining a vehicle yaw rate for the 4WS vehicle;
    multiplying the time delay by a vehicle yaw rate to obtain a result;
    adding the result to a GNSS antenna heading to give a true heading, the true heading corresponding to the heading at the pivot point of the 4WS vehicle; and
    controlling a steering of the 4WS vehicle based on the true heading;
    wherein at least some of the steps are performed using a Kalman filter;
    wherein inputs to the Kalman filter are the vehicle yaw rate, a vehicle speed determined from one of GNSS or wheel speed sensors, vehicle dimensions and the current front and rear wheel angles;
    wherein the vehicle yaw rate is determined by an inertial measurement unit;
    wherein the time delay is a horizontal offset of the pivot point from a centerline of the 4WS vehicle divided by a horizontal velocity of the 4WS vehicle;
    wherein the horizontal velocity is derived from a velocity and direction indicated by the GNSS or from the wheel speed sensors.

12. The method of claim 11 further comprising:
    selecting a control point for the 4WS vehicle, the control point being the point that is controlled to follow a desired trajectory;
    providing the control point to an Ackermann controller; and
    flipping the control point to an opposite side of the pivot point when the 4WS vehicle is in reverse.

13. The method of claim 11 further comprising:
    determining a cross track error (XTE) of the vehicle pivot point compared to a current path curvature of the 4WS vehicle;
    adding the XTE to the pivot point to generate a control point; and
    providing the control point to an Ackermann controller.

14. A non-transitory computer-readable medium having stored thereon instructions that, when executed by one or more processors, cause the one or more processors to perform operations including:
- measuring a current front wheel steering angle;
- measuring a current rear wheel steering angle;
- calculating the 4WS vehicle's dynamic pivot point from the current front wheel steering angle and current rear wheel steering angle;
- determining a distance between the pivot point and a Global Navigation Satellite System (GNSS) antenna;
- determining a time delay in the form of the distance between the GNSS antenna and the pivot point divided by the current vehicle horizontal velocity;
- determining a vehicle yaw rate for the 4WS vehicle;
- multiplying the time delay by a vehicle yaw rate to obtain a result;
- adding the result to a GNSS antenna heading to give a true heading, the true heading corresponding to the heading at the pivot point of the 4WS vehicle; and
- controlling a steering of the 4WS vehicle based on the true heading.

15. The non-transitory computer-readable medium of claim 14 wherein at least some of the steps of claim 1 are performed using Kalman filtering.

16. The non-transitory computer-readable medium of claim 15 wherein inputs to the Kalman filter are the vehicle yaw rate, a vehicle speed determined from the GNSS, vehicle dimensions and the current front and rear wheel angles.

17. The non-transitory computer-readable medium of claim 14 wherein the vehicle yaw rate is determined by an inertial measurement unit.

18. The non-transitory computer-readable medium of claim 14 wherein the time delay is a horizontal offset of the pivot point from a centerline of the 4WS vehicle divided by a horizontal velocity of the 4WS vehicle.

19. The non-transitory computer-readable medium of claim 14 further wherein the instructions further include:
- selecting a control point for the 4WS vehicle, the control point being the point that is controlled to follow a desired trajectory;
- providing the control point to an Ackermann controller; and
- flipping the control point to an opposite side of the pivot point when the 4WS vehicle is in reverse.

20. The non-transitory computer-readable medium of claim 14 further wherein the instructions further include:
- determining a cross track error (XTE) of the vehicle pivot point compared to a current path curvature of the 4WS vehicle;
- adding the XTE to the pivot point to generate a control point; and
- providing the control point to an Ackermann controller.

* * * * *